United States Patent
Genta

[15] 3,681,402
[45] Aug. 1, 1972

[54] ANTHRAQUINONE DYESTUFF MANUFACTURE

[72] Inventor: Guido R. Genta, c/o Koppers Company, Inc., 440 College Park Dr., Monroeville, Pa. 15146

[22] Filed: May 6, 1969

[21] Appl. No.: 830,182

[52] U.S. Cl. ............................260/373, 8/39, 8/40, 260/40 R
[51] Int. Cl. ..............................................C09b 1/50
[58] Field of Search......................................260/373

[56] References Cited

FOREIGN PATENTS OR APPLICATIONS 1,045,411  10/1966  Great Britain................260/373
1,053,455  1/1967   Great Britain................260/373

OTHER PUBLICATIONS

Olam, Friedel–Crafts and Related Reactions, Vol. I, pp. 122, 123, 126, (1963)

Primary Examiner—Lorraine A. Weinberger
Assistant Examiner—E. Jane Skelly
Attorney—James E. Armstrong and Olin E. Williams

[57] ABSTRACT

Anthraquinone dyes are prepared in substantially quantitative yields by reacting a diaminodihydroxyanthraquinone, such as 4,5-diaminochrysazin, with a benzenesulfonyl chloride in a thin fluid melt consisting essentially of anhydrous aluminum halide in admixture with a compound that gives a fluid melt at low temperatures. New dyes having improved substantivity on polyester fibers are made by an alternate embodiment involving the concurrent addition of a halogen such as bromine to the anhydrous aluminum halide melt.

4 Claims, No Drawings

ANTHRAQUINONE DYESTUFF MANUFACTURE

BACKGROUND OF THE INVENTION

It is known from British Patent 1,076,988 that good dyestuffs for aromatic polyester materials can be made by oxidation, with hydrogen peroxide, of a diaminodihydroxyphenylmercaptoanthraquinone. Such dyes are particularly effective when applied to polyester fibers by thermofixation methods in which the padded fiber is heated briefly to temperatures within the range of 180°–220°C. optionally after intermediate drying, for periods of 30 seconds to 1½ minutes. The preparation of the dyestuffs described in the British Patent requires a several step process featuring the preparation of a thiophenoxyanthraquinone followed by subsequent oxidation of the bridging sulfur atom to an $SO_2$-linkage.

I have discovered a novel and economical one-step method of making dyestuffs of the type described in the British Patent from readily available starting materials. My new method provides measurably reduced processing costs and a substantially quantitative yield of product. Furthermore, by using an optional sequential halogenation step, I am able to provide a new series of dyestuffs having improved sublimation properties on linear aromatic polyester fibers.

SUMMARY OF THE INVENTION

In accordance with the invention, an anthraquinone dye of the formula:

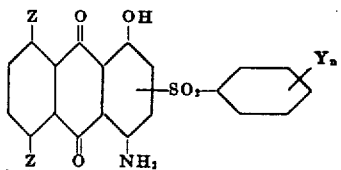

in which one Z is $NH_2$ and the other OH; Y is hydrogen, lower alkyl, chlorine, bromine or nitro; and n is one or two, is made by reacting a diaminodihydroxyanthraquinone with a benzene sulfonyl halide of the formula:

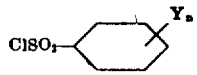

wherein Y and n are as defined above, in a thin fluid melt of anhydrous aluminum chloride or anhydrous aluminum bromide, and recovering the product anthraquinone dyes from the reaction mixture.

An optional, but desirable, embodiment of the invention involves the reaction of the diaminodihydroxyanthraquinone with the benzene sulfonyl halide and, sequentially in the same reaction mixture, a further reaction with up to two moles of bromine or chlorine. The resulting product has the formula:

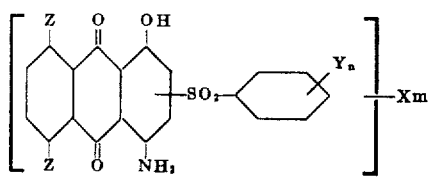

in which Z, Y and n are as defined above; X is chlorine or bromine; and m is one or two. X is attached to a free position in the anthraquinone nucleus.

DETAILED DESCRIPTION

My novel reaction is quite surprising in view of the expected involvement of the amino groups in the presence of a benzenesulfonyl chloride to form a benzenesulfonamide. Also, in contrast, Genta patent U.S. Pat. No. 3,426,047, issued Feb. 4, 1969, describes a reaction of 1-amino-2-phenoxy-4-hydroxyanthraquinone with an acyl halide in the presence of aluminum chloride. In that process, the acyl halide reacts with the phenyl group and with the amino group rather than the anthraquinone nucleus showing the preferential attraction of acyl halides for substituents attached to an anthraquinone nucleus rather than the nucleus itself.

The basic reactant used in the invention is a diaminodihydroxy anthraquinone, i.e., 4,5-diaminochrysazine, 4,8-diaminoanthrarufin, or commercial mixtures thereof.

Useful sulfonyl halides include benzenesulfonyl chloride and benzenesulfonyl chloride substituted with one or two of the same or different groups, including lower alkyl, lower alkoxy, chlorine, bromine or nitro groups.

The novel reaction of the invention takes place in a thin fluid melt consisting essentially of anhydrous aluminum trichloride or aluminum tribromide in admixture with a compound that gives a fluid melt at low temperature. The preparation of such melts, is well established in the dyestuff art and is described, for example, in Genta patent U.S. Pat. No. 2,650,928, issued Sept. 1, 1953. The fluid character of the melt can be achieved by admixing the anhydrous aluminum trihalide with either an alkali metal halide, $SO_2$, urea, or a tertiary base.

If an alkali metal halide is used to provide the fluid melt, it should be present in an amount of one part by weight alkali metal halide to each 5–10 parts by weight aluminum halide. Useful alkali metal halides include sodium chloride, sodium bromide, potassium chloride, potassium bromide, lithium chloride and the like.

From a practical standpoint, I prefer to make the melt by admixing the aluminum trihalide with a tertiary base which is liquid at a temperature ranging from about 80–130°C. Useful tertiary bases include pyridine, Δ-picoline, quinoline, dimethylaniline, diethylaniline, triethylamine, dimethylformamide, and dimethylacetamide. The use of 0.05–0.5 part by weight of the tertiary base to one part by weight of the aluminum halide will provide a satisfactory melt.

The melt is made by charging the anhydrous aluminum halide, in a quantity sufficient to enable mixing of the reactants, e.g., 1–5 parts by weight, based on the weight of the reactants, to a suitable reactor. An appropriate quantity of the compound used to thin the melt, for example, the tertiary base, is added to the aluminum halide. The mixture is heated, conveniently to a temperature of 120°–130°C., to provide a uniform thin fluid melt.

The melt is cooled and the diaminodihydroxyanthraquinone is added thereto. The benzenesulfonyl halide is then added slowly, conveniently drop-wise, to control the exothermicity of the reaction, and the temperature of the melt is raised to 75°–125°C., preferably to 95°–100°C. Sufficient benzenesulfonyl chloride is added to provide substantially stoichiometric quantities of the two reactants. A slight excess of the sulfonylchloride is sometimes helpful in pushing the reaction to completion. The reaction is allowed to continue until completion, which ordinarily requires 1 to 4 hours.

After the reaction is complete, the product is separated from the melt by drowning the reactionmass in ice water and thoroughly agitating the mixture, preferably in the presence of dilute hydrochloric acid. The mixture is boiled, separated by filtration. The filter cake is washed acid free, and excess water is removed conveniently by drying at 60°–120–C.

The novel improved dyestuffs of the invention are made by a variation of the foregoing procedure in which a halogen, either chlorine or bromine, is introduced to the fluid melt following the addition of the benzenesulfonyl chloride. Conveniently, this is accomplished by temporarily lowering the temperature of the melt to 60°–80°C. and slowly introducing halogen or a halogen supplying compound. Bromination is most conveniently accomplished by adding molecular bromine. Chlorine can be added as chlorine gas or as sulfuryl chloride. The melt is then raised to its original temperature, preferably, 95°–100°C., and the reaction is continued for an additional 1–3 hours. The reaction mass is then drowned in ice water and the product is recovered as described above.

The dyestuffs made by the method of the invention are applied to aromatic polyester fibers in the form of a dispersed color powder or paste, which is obtained by wet milling in a conventional apparatus such as a ball mill, the dye, a dispersant such as sodium lignin sulfonate, and a wetting agent. The dispersed cake or paste thus obtained can be dried, if desired at 70°–80 °C. and thereafter micropulverized. Sufficient dispersant is added to give a dispersed powder containing generally between 40–50 percent by weight active dyestuff base.

The dispersed powder, when added to water with or without auxiliary agents, forms a near colloidal aqueous dispersion from which the aromatic polyester fiber or goods is dyed in the conventional manner to give a fiber containing from 0.01–2 percent dyestuff.

The new dyes are also good colors for nylon superpolyamide and cellulose triacetate.

My invention is further illustrated by the following examples:

EXAMPLE I

A 1-liter flask, equipped with a heater, stirrer and thermometer, was charged with 400 g. anhydrous aluminum chloride. There was then added portion-wise 100 g. of dimethylformamide while maintaining the temperature below 120°–130°C. A 54 g. quantity of diaminochrysazin was added after cooling the thin fluid melt to about 55°C. A 49 g. quantity of benzenesulfonyl chloride was added drop-wise over a period of about one hour. The mixture was heated slowly to 95°–100°C. for about 1½ hours. The melt was then poured into 1,500 cc. of ice water containing 65 g. of 20° Baume hydrochloric acid. Using live steam the suspension was heated to boiling and the product dye was filtered and washed acid free and free of aluminum salts with hot water. There was thus obtained 261 g. of wet cake, corresponding to 83 g. dye or 100 percent of theory of a product of the formula:

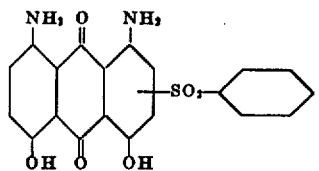

The dye was made into a paste at 20 percent by ball milling for 24 hours with 20 parts by weight, based on 100 parts dye, of sodium lignin sulfonate, available commercially as Marasperse N-22, 1 part wetting agent and sufficient water to provide the 20 percent paste. The dispersed dyestuff colored polyester fiber in bright blue shades of excellent fastness to light and good fastness to sublimation.

EXAMPLE II

A 1-liter flask equipped with heater, stirrer, and thermometer was charged with 500 g. anhydrous aluminum chloride. There was then added portion-wise 125 g. dimethylformamide while keeping the temperature below 120°C. with external cooling. The melt was cooled to 55°–60°C. and thereafter 70 g. benzenesulfonyl chloride and 70 g. diaminochrysazin were added. The reaction mass was heated slowly to 95°–100°C. and held at this temperature for a 1-hour period. It was then cooled to 70°C. and 84 g. of bromine was added dropwise. The melt was reheated to 95°–100°C. ans was held at this temperature for an additional hour.

The product was recovered by pouring the melt into 2,000 cc. of ice water containing 85 g. of 20° Baume hydrochloric acid. The diluted mass was stirred to uniformity. It was then heated to 90°–95°C. by means of live steam. The brominated product was filtered and washed acid free with hot water. The yield was 550 g. of wet cake at 24 percent, corresponding to 132 g. as dry powder.

The product was dispersed as described above by ball milling 550 g. of wet cake with 100 g. of a sodium lignin sulfonate, Marasperse N-22, yielding 660 g. of 20 percent paste. The product dye had the formula:

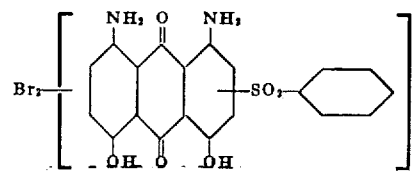

in which the bromine atoms were attached to an undetermined free position on the anthraquinone nucleus. The product dyed polyester fiber in bright blue shades of excellent lightfastness and improved sublimation properties in comparison with those of the product of Example I.

EXAMPLE III

The procedure of Example II was repeated, with the exception that the amount of bromine added to the melt was reduced to 42 g. The resulting product was monobrominated with the bromine being attached to an undetermined free position in the anthraquinone nucleus. The dye, when standardized in the conventional manner, dyed polyester fiber in blue shades of excellent fastness to light and sublimation.

EXAMPLE IV

The procedure of Example III was repeated, with the exception that one mole of chlorine was introduced into the molecule by adding to the melt 35 g. sulfuryl chloride in lieu of the 42 g. of bromine. The resulting blue dyestuff appeared somewhat redder in artificial light than the products of Examples I, II or III.

The dyestuff was standardized in the conventional manner to provide a 17 percent paste for dyeing polyester fiber in bright reddish-blue shades having excellent lightfastness and sublimation properties.

EXAMPLE V

By repeating the procedure of Example II using a commercial mixture of diaminochrysazin and diaminoanthrarufin, a bright blue dyestuff is obtained.

EXAMPLE VI

By repeating the procedure of Example II using only one mole of bromine and one mole of sulfuryl chloride, a bright blue dyestuff containing mixed halogen is obtained.

What is claimed is:

1. A method of making an anthraquinone dye of the formula:

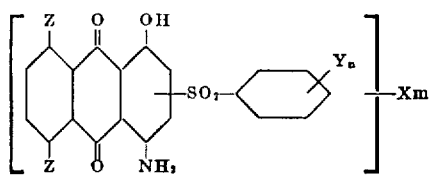

in which one Z is —NH$_2$ and the other —OH; Y is a member selected from the group consisting of hydrogen, lower alkyl, lower alkoxy, chlorine, bromine, and nitro, m and n are integers having a value of one or two, and X is chlorine or bromine, X being attached to a free position on the anthraquinone nucleus, comprising reacting an anthraquinone compound of the formula:

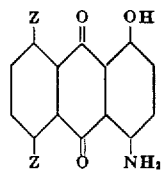

wherein Z is as defined aforesaid, with a substantially stoichiometric quantity of a benzene sulfonyl chloride of the formula:

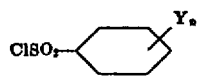

wherein Y and n are as defined aforesaid, and 1–2 moles, per mole of anthraquinone compound of a compound of the formula:

$$SO_2Cl \text{ or } X_2$$

wherein X is as defined aforesaid, $X_2$ being used to provide a dye of the above formula in which X is Br, in a fluid melt of an anhydrous aluminum halide of the formula: $AlX'_3$, wherein X' is chlorine or bromine and recovering the product anthraquinone dye from the reaction mixture.

2. Method according to claim 1 in which the reaction temperature of the melt is 75°–125°C. and the melt is anhydrous aluminum chloride.

3. A method of making an anthraquinone dye of the formula:

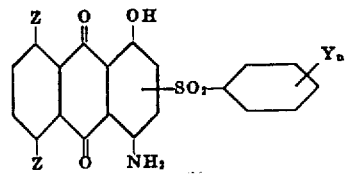

in which one Z is —NH$_2$ and the other —OH; Y is a member selected from the group consisting of hydrogen, lower akyl, lower alkoxy, chlorine, bromine and nitro; and n is an integer having a value of one or two, comprising reacting anthraquinone compound of the formula:

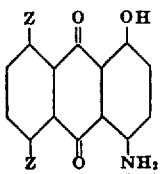

wherein Z is defined as aforesaid with a substantially stoichiometric quantity of a benzene sulfonyl chloride of the formula:

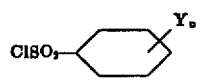

wherein Y and n are as defined aforesaid, in a fluid melt of an anhydrous aluminum halide of the formula:

$$AlX'_3$$

wherein X' is chlorine or bromine, and recovering the product anthraquinone dye from the reaction mixture.

4. Method according to claim 3 in which the reaction temperature of the melt is 75°–125°C. and the melt is anhydrous aluminum chloride.

* * * * *